W. H. GRAY AND J. W. HOWLETT.
METHOD OF MAKING PISTON RINGS AND DIE FOR SAME.
APPLICATION FILED DEC. 23, 1920.
1,415,439.
Patented May 9, 1922.
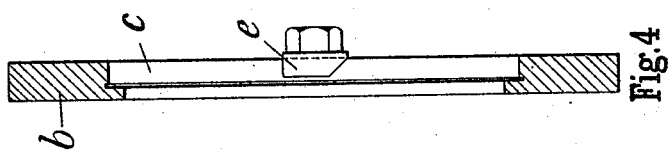
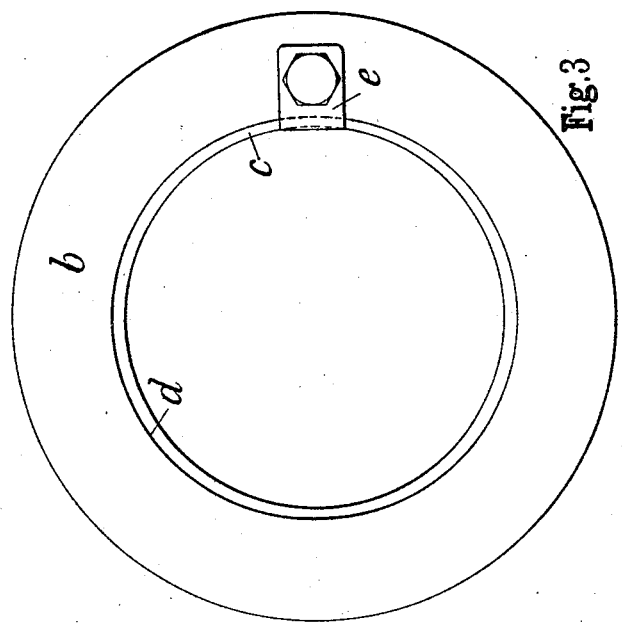
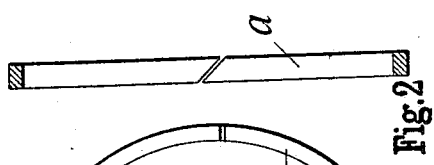
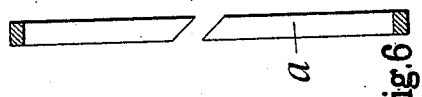
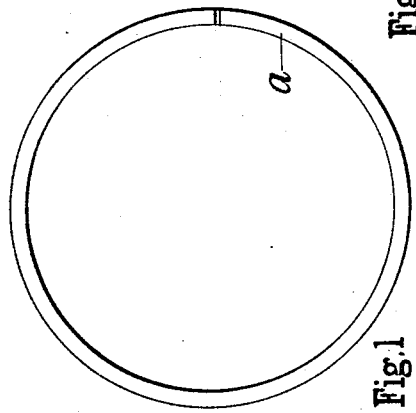
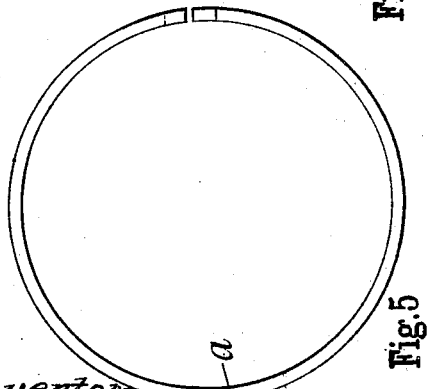
Inventors
W. H. Gray and J. W. Howlett
By H. R. Kerslake Atty

UNITED STATES PATENT OFFICE.

WILLIAM HENRY GRAY AND JOHN WILLIAM HOWLETT, OF LYMINGTON, ENGLAND.

METHOD OF MAKING PISTON RINGS AND DIE FOR SAME.

1,415,439.  Specification of Letters Patent.  Patented May 9, 1922.

Application filed December 23, 1920. Serial No. 432,813.

*To all whom it may concern:*

Be it known that we, WILLIAM HENRY GRAY, residing at Fern Cottage, Western Road, Lymington, in the county of Hants, England, and JOHN WILLIAM HOWLETT, residing at The Rosary, Waterford Road, Lymington, in the county of Hants, England, subjects of the King of Great Britain and Ireland, have invented certain new and useful Improvements in Methods of Making Piston Rings and Die for Same, of which the following is a specification.

This invention has for its object to provide an improved method of making piston rings and the like, and also to provide improved means for use in the manufacture of such rings.

Referring to the accompanying sheet of explanatory drawings which illustrate the manufacture of a piston ring in accordance with this invention:—

Figures 1 and 2 are side elevation and cross section of the initial ring after division.

Figures 3 and 4 are side elevation and cross section of the die in which the said ring is held during hammering.

Figures 5 and 6 are side elevation and cross section of the finished ring.

In the production of piston rings as shown, a cast iron or other cylindrical shell is machined to produce accurately concentric circular peripheries, and the shell is subsequently parted off to form rings of the required width. Each ring is subsequently divided obliquely or otherwise, or a small piece is broken out of it in the usual manner. A ring at this stage is shown by *a* at Figures 1 and 2. The adjacent ends of the ring are pulled apart to an extent rather greater than that shown in Figures 5 and 6 and a die is made having a recess whose periphery corresponds exactly to that of the ring in the said stretched or distorted condition. Such a die is shown by *b* in Figures 3 and 4, the shape of the periphery of the recess *c* in which the ring is placed being approximately represented by the non-circular line *d*. The exact shape of the die may be determined mathematically, but it may conveniently be determined by copying accurately the shape of the ring when distorted as above described. When placed in the die the ring is held in close contact with the periphery of the die recess by a block *e* attached to the die, the separated ends of the ring being caused to abut against opposite sides of this block. While in the die the ring is lightly hammered around its inner periphery until it receives a permanent set, the amount of hammering or stressing being varied to suit the outward pressure which the ring is required to exert when in service. After this treatment the finished ring is taken out of the die, and it then springs inwards to some extent but does not resume its original truly circular form. A finished ring is shown at Figures 5 and 6.

When in service on a piston, the ring is sprung inwards to allow of its being slipped into the cylinder in which it is required to work, and it then has its original circular form, but now it tends to expand and in so doing it exerts a uniform outward radial pressure against the cylinder wall.

It is evident that this invention is equally applicable to rings in which the inner periphery is eccentric to the outer periphery, the only difference in the manufacture being that the original ring is machined to the desired eccentric form.

In some cases the ring may be originally shaped to what has above been described as the distorted or non-circular form, in accordance with known practice. Such a ring has a portion removed from it to permit of its being subsequently contracted to the circular form. After having been thus divided, and while possessing its original non-circular configuration, it is placed in a correspondingly shaped die and hammered as above described. When contracted to the circular form the ring then exerts a more uniform outward radial pressure than when, as heretofore, the hammering operation is not used.

Having thus described our invention what we claim as new and desire to secure by Letters Patent is:—

1. In the manufacture of piston and like rings, the holding of a divided ring which is stretched, or initially shaped, to a non-circular form, in a correspondingly shaped die, and hammering the ring while thus held, substantially as described.

2. In the manufacture of piston and like rings, the formation of a ring initially with inner and outer peripheries of circular form, and, after dividing or breaking the ring and distorting the same by expansion, holding the ring while distorted in a die and hammering it for the purpose of producing a permanent set, substantially as described.

3. For use in the manufacture of piston rings and the like, a die having a non-circular form adapted to support a non-circular divided ring uniformly around its outer periphery, and a block adapted to hold apart the ends of the ring and secure the ring in close contact with the die, substantially as described.

In testimony whereof we have signed our names to this specification.

WILLIAM HENRY GRAY.
JOHN WILLIAM HOWLETT.